United States Patent Office 3,096,830
Patented July 9, 1963

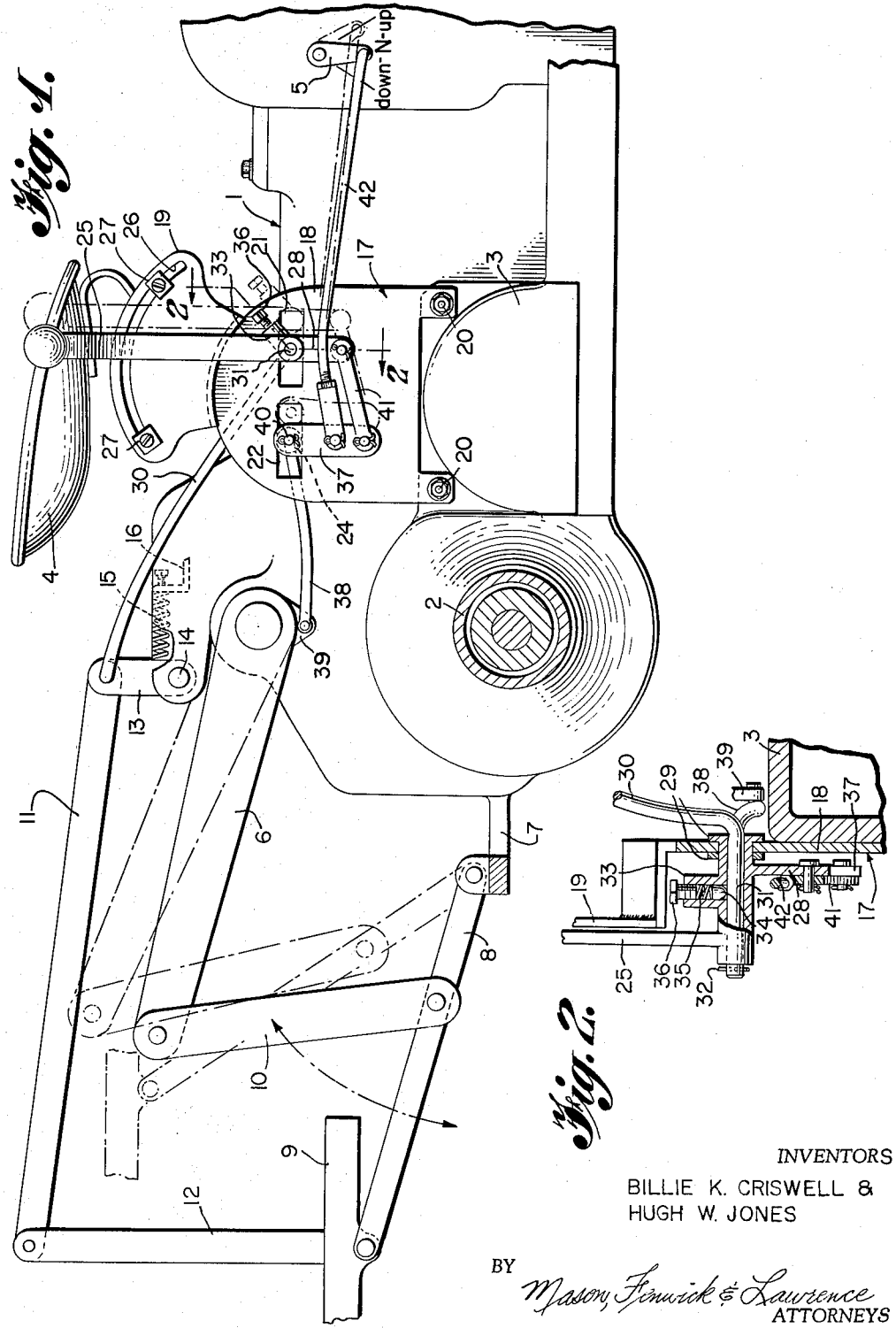

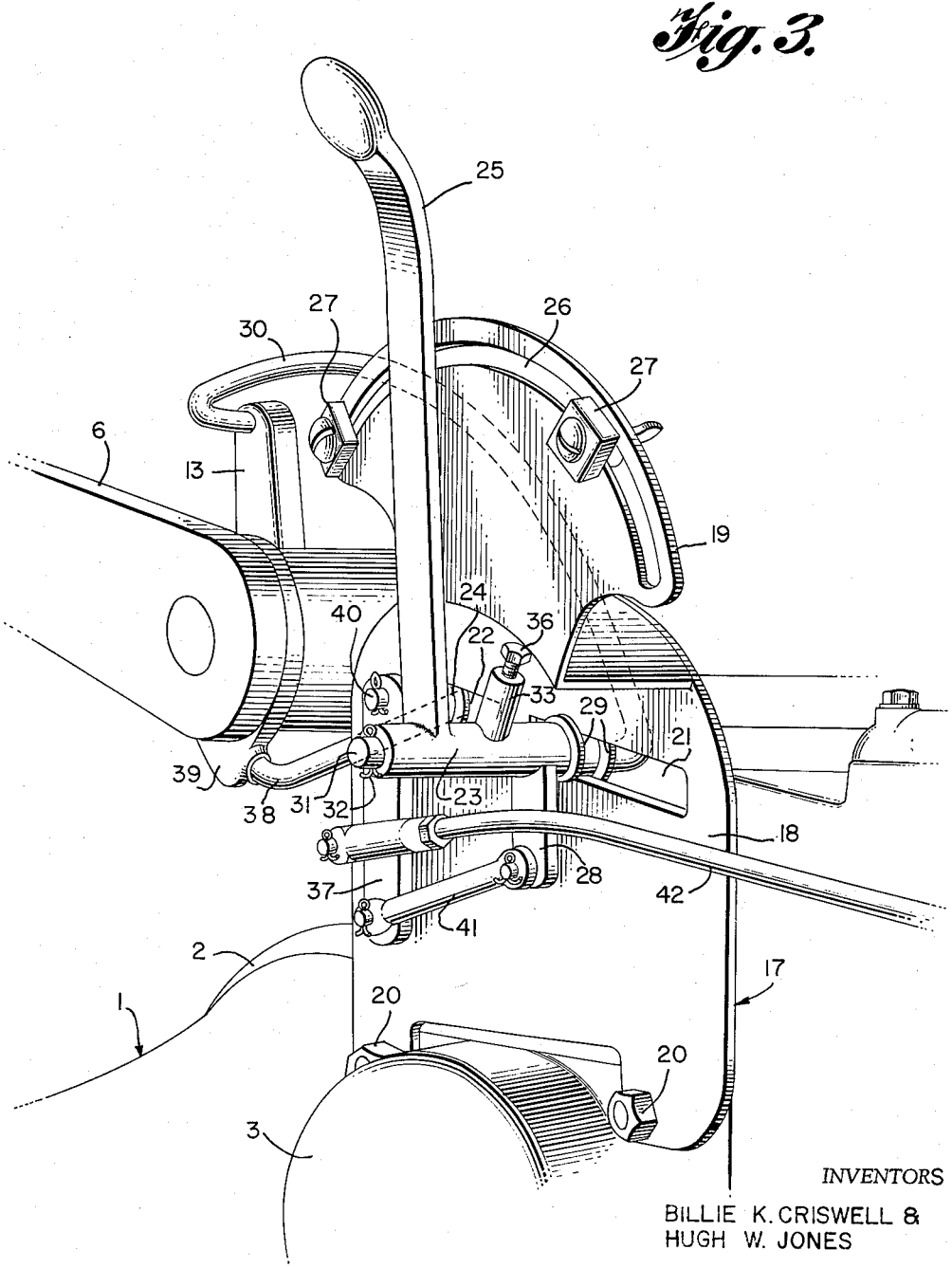

3,096,830
DRAFT CONTROL MECHANISM
Billie K. Criswell, Rte. 2, Altoona, Ala., and
Hugh W. Jones, Brooksville, Ala.
Filed Nov. 2, 1960, Ser. No. 66,868
7 Claims. (Cl. 172—9)

This invention relates to automatic mechanisms for controlling the working depth of tractor-mounted earth-working implements, and particularly to devices for maintaining such implements at pre-selected depths irrespective of tractor movement.

It is well known that in using tractor drawn earth-working implements, such as agricultural implements, the ground engaging, or working, tool will change its angle of attack and its position relative to the ground surface as the tractor moves over uneven ground. This is undesirable from the standpoint of creating too shallow and too deep working in some areas, and results in unequal draft load upon the tractor.

Some tractors are being built with draft compensating means to automatically raise or lower the implement depth as required to maintain a predetermined working depth. While these perform very well, they are costly and complicated. A tractor having this built in equipment must be purchased at the outset, for there is no way of applying the known equipment to a completed tractor.

The present invention has two general objects, to provide a simplified draft control mechanism which will be dependable and accurate in operation, and to provide a device of this kind which can be applied to existing tractors to convert them to automatic control.

A more specific object of the invention is to provide a draft control mechanism which will be responsive to variations in draft load to cause the implement to be lifted or lowered as required to maintain a constant depth.

Another object is the provision of such an attachment which will permit raising and lowering the implement without interference from the control device, yet will maintain the implement at any adjusted depth without adjustment of the control mechanism.

Yet another object is to provide a control mechanism which will have all of its operating parts visible on the outside of the tractor so that repairs can be made without difficulty.

A further object is to provide a control of this nature which will be of rugged construction and can be manufactured and sold inexpensively.

Other objects of the invention will become apparent from the following description of one practical embodiment thereof, when taken in conjunction with the drawings which accompany, and form part of, this specification.

In the drawings:
FIGURE 1 is a side elevation of part of a tractor with its lift arms and a portion of an implement connected to the lift arms, with a control device embodying the principles of the present invention being shown attached to the tractor and connected for operation.

FIGURE 2 is a detail vertical section taken on the line 2—2 of FIGURE 1; and

FIGURE 3 is a perspective view of the control mechanism with associated parts of the tractor.

In general, the device of the present invention includes mechanism which may be intercoupled between means which are movable in response to draft load changes and a hydraulic lift control valve, to cause operation of the lift valve in response to draft load changes and adjust the lift mechanism to maintain the draft implement at its preset working depth. The mechanism includes means to permit independent operation of the lift mechanism.

Referring to the drawings in detail, a portion of a tractor 1 is shown, having a rear axle and housing, indicated generally at 2, a brake housing 3, a seat 4 for the operator and a hydraulic valve control arm 5. The arm 5 is connected to, and operates, a valve (not shown) which controls the movement of the usual implement lift arms 6. The valve is conventional structure and is not thought to need illustration. Other conventional structure shown includes the tractor draw bar 7, bottom tension link 8 connected to the draw bar and to an implement 9, a lift link 10 connected to the lift arm 6 and the bottom tension link, and a top tension link 11 connected between the implement mast 12 and a spring loaded lever 13. Lever 13 is pivoted at 14 to the tractor side, and is in contact with one end of a coiled spring 15 which has its opposite end seated against a bracket 16.

The above-described structure operates in well-known manner to raise and lower the implement as desired. When valve arm 5 is moved to one side or the other, the lift arms 6 will be caused to raise or lower and, through lift link 10 and bottom tension 8, raise or lower the implement. The top tension link 11 serves as a stabilizer to maintain the implement in a more or less horizontal position at all times. Due to the pivotal connection of the implement to the bottom tension link, increased drag of the implement will cause the implement mast to tilt forward and through the top tension link and lever 13 compress the spring 15. The spring is calibrated to return the parts to normal position when the drag returns to normal.

The attachment of the present invention is mounted upon a plate 17, which is connected to the tractor brake housing 3. The plate consists of a lower mounting section 18 and an upper quadrant 19. The mounting section is connected to the brake housing by the bolts 20.

The mounting section of the plate 17 contains two horizontal slots 21 and 22 arranged in end to end alignment. A hollow control shaft 23 is mounted in slot 21 for rotation and sliding movement in the slot. A shaft 24 is similarly mounted in slot 22.

Control shaft 23 carries an operating handle 25, by means of which the apparatus may be controlled to raise or lower the implement or set the depth at which the implement will work. The handle moves over quadrant 19 which is provided with an arcuate slot 26 to receive adjustable limit stops 27. The stops can be fixed in any desired positions along the slot to lie in the path of and limit the movement of, the handle 25. Control shaft 23 also carries a lever arm 28 which is diametrically opposed to the operating handle. The control shaft is provided with spaced flanges 29 which embrace opposite sides of plate 17 and hold the shaft against axial movement.

A control rod 30 is connected to control shaft 23 and to the spring loaded lever 13, in such manner that rocking movement of lever 13 will cause control shaft 23 to slide in slot 21. The control rod may take any desired shape, but it has an end 31 at right angles to the plane of the major portion of the rod which fits rotatably within the hollow control shaft 23. The rod end may be retained in the shaft by means of a cotter pin 32. It is desired that the shaft 23 be held fixed relative to the rod end 31 except at such times as it is necessary to manually control the raising or lowering of the implement, or to readjust the depth setting. To this end, the control shaft is provided with an upstanding, hollow boss 33 which opens to the interior of the hollow shaft. A friction plunger 34 is slidable in the boss and held in braking engagement with the rod end 31 by means of a spring 35. The spring is held within the boss and under proper tension by an adjusting screw 36 threaded in the top of the boss. The pressure of plunger 34 upon the rod end can be varied by loosening or tightening screw 36.

Shaft 24 carries a lever arm 37 which extends downwardly. A rod 38 is connected to an ear 39, fixed to the lift arm 6, and has its opposite end bent to provide an angularly positioned end 40 to fit within shaft 24, in a manner similar to the rod end 31 in the shaft 23. There is no friction device in this connection, however. It will be clear that this arrangement causes the shaft 24 to move lengthwise of its slot 22 when the lift arm rocks, and the position of the lift arm will determine the position of shaft 24 and lever arm 37. The opposite end of lever arm 37 is connected by link 41 to the lower end of lever arm 28. A rod 42 has one end pivotally connected to an intermediate portion of the lever arm 37, and its opposite end pivotally connected to the valve control arm 5. Thus, any movement of lever arm 37, either pivotal or bodily movement, will result in operation of the valve control arm 5 and consequent movement of the lift arms 6.

It will be obvious from an inspection of the drawings that the parts may be assembled on plate 17 with the various rods and links connected to the respective lever arms mounted on the plate. To install the device, it is only necessary to mount the plate upon the brake housing bolts, or studs, and connect rod 30 to spring-loaded lever 13, rod 38 to lift arm ear 39, and rod 42 to valve arm 5. The stops 27 can be set to the desired limits of movement of operating handle 25 to achieve maximum desired lift and lowering of the implement, and the device will be ready for automatic operation.

In operation, the handle 25 will be moved to set it to lower the implement to the depth at which it is desired to work the earth. Movement of the lever is possible when sufficient force is exerted to overcome the frictional drag of the plunger 34 and the hollow shaft 23 will rotate on the rod end 31. This will cause movement of lever arm 28 and, through link 41, lever arm 37 and rod 42, movement of the control valve lever 5 and lowering movement of the arms 6 and the implement. The implement will move downward to the position for which the handle is set, and as long as the implement stays at this depth and the draft remains constant, there will be no further movement of the control.

If, due to the movement of the tractor over uneven ground, or for other reasons, the implement goes too deep and the draft is increased, the drag will cause the implement to rock about its connection with the bottom tension link 8 so that the mast 12 will increase its forward thrust on the top tension link 11 and cause forward rocking movement of the lever arm 13 against the spring 15. This will push rod 30 forwardly and thereby move the hollow shaft forwardly in its slot 21. As the friction drag will hold the shaft against rocking on the rod end 31, the forward movement of the shaft will move lever arm 28 forwardly and draw link 41 to rock lever 37 about the rod end 40 as a fulcrum. This will cause rod 42 to move control lever 5 to the up position to raise the lift arms 6 and the implement. As the implement is raised, two things occur; the movement of arm 6 actuates rod 38 to swing lever 37 rearwardly about its pivotal connection with link 41 as a fulcrum, and thus move the control lever 5 back toward its original position, and the decreasing implement drag as the implement raises permits the top tension link to return to its original position and, through rod 30 return shaft 23 to its former position in slot 21.

It will be obvious that when movement of the tractor causes the implement to raise and decrease the draft an opposite movement of the control linkage occurs and the control lever 5 is moved to lower the implement. Thus, the depth at which the implement is set will be maintained automatically. It will be understood that the operation of the device is not dependent upon depth changes of the implement alone, but the mechanism will respond to any change in draft conditions to keep an equalized draft upon the tractor.

While one practical embodiment of the invention has been disclosed, it will be understood that the precise details of structure shown and described are merely by way of example and the invention may take other forms within the scope of the appended claims.

What is claimed is:

1. Draft control mechanism for tractors having implement connecting means which includes upper and lower tension links for connection to the implement with the top tension link being connected to a spring-loaded lever, and lift arms for raising and lowering the implement operated by means including a control valve lever, the draft control comprising, a mounting plate attachable to the tractor and having a pair of slots therein parallel to and elongated in the direction of the plane of rocking movement of the spring-loaded lever, an operating handle having a hub extending through one of the slots and mounted therein for rotative and bodily sliding movement lengthwise of said one slot, a lever arm having a hub extending through the other of the slots and mounted therein for rotative and bodily sliding movement lengthwise of the said other of the slots, the operating handle hub having an arm projecting radially therefrom, a rod connecting the hub of the lever arm and the lift arms, a link connecting the radially projecting arm and the free end of the lever arm opposite the hub, a rod having one end connected to the operating handle and its other end connectible to the spring-loaded arm, and a rod having one end connected to the lever arm intermediate the hub and free end of the lever arm and its opposite end connectible to the control valve lever.

2. Draft control mechanism as claimed in claim 1 wherein the connection between the operating handle hub and the rod connected thereto is a rotatable one to permit rotative movement of the operating handle relative to the rod.

3. Draft control mechanism as claimed in claim 1 wherein the connection between the operating handle hub and the rod connected thereto is a rotatable one to permit rotative movement of the operating handle relative to the rod, and means to retard free rotation of the operating handle.

4. Draft control mechanism as claimed in claim 3 wherein the means to retard free rotation includes a spring-pressed plunger carried by the operating handle hub in engagement with the rod connected to the operating handle hub.

5. Draft control mechanism as claimed in claim 4 wherein there is means to adjust the engagement pressure of the spring-pressed plunger with the rod connected to the operating handle.

6. A draft control attachment for tractors having implement connecting means which includes upper and lower tension links for connection to the implement with the top tension link being connected to a spring-loaded lever, and lift arms for raising and lowering the implement operated by means including a control valve lever, the attachment comprising, a mounting plate attachable to a tractor to lie in a plane parallel to the plane of rocking movement of the spring-loaded lever with a widthwise dimension extending in the direction of rocking movement of the spring-loaded lever, the plate having a pair of slots therein elongated in the widthwise direction of the plate, an operating handle having a hub extending through one of the slots and mounted therein for rotative and bodily sliding movement lengthwise of said one slot, a lever arm having a hub extending through the other of the slots and mounted therein for rotative and bodily sliding movement lengthwise of the said other of said slots, the operating handle hub having an arm projecting radially therefrom, a rod connected at one end of the hub of the lever arm and having its other end adapted for connection to the tractor lift arms, a link connecting the radially projecting arm and the free end of the lever arm opposite the hub, a rod having one end connected to the operating handle and its other end adapted for connection to the tractor spring-loaded arm, and a rod having one end connected to the lever arm intermediate the hub and free end of the lever arm and its opposite end adapted for connection to the tractor control valve lever.

7. Draft control mechanism for tractors having implement connecting means which includes upper and lower tension links for connection to the implement with the top tension link being connected to a spring-loaded lever, and lift arms for raising and lowering the implement operated by means including a control valve lever, the draft control comprising, a lever arm, means pivotally connected at one end of the lever arm and to the spring-loaded lever to rock the lever arm upon movement of the spring-loaded lever, means pivotally connected to the opposite end of the lever arm and to the lift arms to rock the lever arm about the first-mentioned pivotal connection when the lift arms are moved, and means connected to the lever arm at an intermediate point and to the control valve lever, whereby the lever arm may rock about the pivotal connections at its ends as fulcrums to move the control valve lever upon movement of the spring-loaded lever and upon movement of the lift arms, the means interconnecting the said one end of the lever arm and the spring-loaded lever including, a shaft, means mounting the shaft for bodily sliding movement transversely of the shaft axis and in the direction of rocking movement of the spring-loaded lever, the shaft carrying an arm fixed thereto and projecting radially therefrom, a link connected to the end of the projecting arm and said one end of the lever arm, and a rod interconnecting the shaft and the spring-loaded lever to move the shaft transversely of its axis upon movement of the spring-loaded lever, the shaft having an operating lever fixed thereto, the shaft being rotatably connected to the rod, and means to releasably hold the shaft against rotation relative to the rod.

References Cited in the file of this patent

UNITED STATES PATENTS

| | | |
|---|---|---|
| 2,722,874 | Bopf | Nov. 8, 1955 |
| 2,851,938 | Giertz et al. | Sept. 16, 1958 |
| 2,864,295 | Du Shane | Dec. 16, 1958 |